(12) United States Patent
Kang et al.

(10) Patent No.: US 10,587,787 B2
(45) Date of Patent: *Mar. 10, 2020

(54) DISPLACEMENT SENSOR AND CAMERA MODULE HAVING THE SAME

(71) Applicant: LG ELECTRONICS INC., Seoul (KR)

(72) Inventors: Hyungjoo Kang, Seoul (KR); Sungdu Kwon, Seoul (KR); Salkmann Ji, Seoul (KR); Samnyol Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/168,042

(22) Filed: Oct. 23, 2018

(65) Prior Publication Data

US 2019/0068852 A1     Feb. 28, 2019

Related U.S. Application Data

(63) Continuation of application No. 15/442,389, filed on Feb. 24, 2017, now Pat. No. 10,142,527.

(Continued)

(30) Foreign Application Priority Data

Oct. 7, 2016   (KR) .................. 10-2016-0129721

(51) Int. Cl.
*H04N 5/225*    (2006.01)
*G01D 5/20*     (2006.01)

(Continued)

(52) U.S. Cl.
CPC ......... *H04N 5/2254* (2013.01); *G01D 5/2046* (2013.01); *G02B 7/08* (2013.01);
(Continued)

(58) Field of Classification Search
CPC .. H04N 5/2254; H04N 5/2257; H04N 5/2252; G02B 7/08; G02B 13/004; G02B 27/646; G01D 5/2046
See application file for complete search history.

(56) References Cited

U.S. PATENT DOCUMENTS 4,425,511 A   1/1984   Brosh
5,617,023 A   4/1997   Skalski
(Continued)

FOREIGN PATENT DOCUMENTS

KR   10-2012-0032353 A   4/2012
KR   10-2015-0020950 A   2/2015
KR   10-2015-0022637 A   3/2015

*Primary Examiner* — Jason A Flohre
(74) *Attorney, Agent, or Firm* — Birch, Stewart, Kolasch & Birch, LLP (57) ABSTRACT

A displacement sensor includes a first frame; a second frame; a first coil including a first voltage formed at the first frame applied to the first coil; a second coil formed at the first frame including a current of a second voltage flowing in the second coil corresponding to a voltage of the first frame if the first voltage is applied to the first coil; a conductor coupled to the second frame; and a detector for calculating a relative position between the first frame and the second frame by monitoring the second voltage. Further, a size of the second voltage is reduced if the second coil is moved closer to the conductor.

19 Claims, 8 Drawing Sheets

Related U.S. Application Data (60) Provisional application No. 62/322,809, filed on Apr. 15, 2016.

(51) Int. Cl.
- *G02B 7/08* (2006.01)
- *G02B 13/00* (2006.01)
- *G02B 27/64* (2006.01)

(52) U.S. Cl.
CPC ......... *H04N 5/2252* (2013.01); *H04N 5/2257* (2013.01); *G02B 13/004* (2013.01); *G02B 27/646* (2013.01)

(56) References Cited

U.S. PATENT DOCUMENTS

| | | |
|---|---|---|
| 2003/0141866 A1 | 7/2003 | Johnson et al. |
| 2006/0028320 A1 | 2/2006 | Osaka |
| 2006/0290346 A1 | 12/2006 | Habenschaden et al. |
| 2009/0252488 A1 | 10/2009 | Eromaki et al. |
| 2009/0278978 A1 | 11/2009 | Suzuki |
| 2013/0027602 A1* | 1/2013 | Kasuga ................ H04N 5/2257 348/335 |
| 2013/0286283 A1 | 10/2013 | Chou |
| 2014/0354070 A1 | 12/2014 | Watanabe et al. |
| 2014/0368220 A1 | 12/2014 | Kum et al. |
| 2015/0108969 A1 | 4/2015 | Krenik |
| 2015/0130990 A1 | 5/2015 | Cho et al. |
| 2015/0207983 A1 | 7/2015 | Kang et al. |
| 2016/0198070 A1* | 7/2016 | Nakano ................ H04N 5/2257 348/374 |
| 2016/0209620 A1 | 7/2016 | Code |
| 2016/0282580 A1 | 9/2016 | Koyama et al. |
| 2016/0363463 A1 | 12/2016 | Niwa et al. |
| 2017/0146889 A1 | 5/2017 | Bang et al. |
| 2017/0171469 A1 | 6/2017 | Sekimoto |
| 2017/0351159 A1* | 12/2017 | Kudo ................... H04N 5/2254 |

\* cited by examiner

DISPLACEMENT SENSOR AND CAMERA MODULE HAVING THE SAME

CROSS-REFERENCE TO RELATED APPLICATIONS

This Application is a Continuation of co-pending U.S. patent application Ser. No. 15/442,389 filed on Feb. 24, 2017, which claims the priority benefit under 35 U.S.C. § 119(e) to U.S. Provisional Application No. 62/322,809 filed on Apr. 15, 2016, and under 35 U.S.C. § 119(a) to Korean Patent Application No. 10-2016-0129721 filed on Oct. 7, 2016, all of which are hereby expressly incorporated by reference into the present application.

BACKGROUND OF THE INVENTION

Field of the Invention

The present invention relates to a displacement sensor using two coils and a camera module having the same.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In accordance with increase of multimedia functions, various parts are packaged in the mobile terminal, whereby a high scale integrated part of which size is reduced and performance becomes more excellent has been used. Particularly, for more exact control, the part is provided with a sensor therein. A size of the sensor gets smaller as the size of the part is reduced.

Particularly, since a camera module becomes thinner due to the thickness of the mobile terminal which becomes thin, the camera module is provided with a sensor for finely controlling a position between a lens and an image sensor, whereby image of high quality can be obtained.

SUMMARY OF THE INVENTION

Accordingly, the present invention is directed to a displacement sensor and a camera module having the same that substantially obviates one or more problems due to limitations and disadvantages of the related art.

An object of the present invention is to provide to a displacement sensor using two coils and a camera module having the same.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a displacement sensor comprises a first frame; a second frame; a first coil to which a first voltage formed at the first frame is applied; a second coil formed at the first frame, to which a current of a second voltage flows if the first voltage is applied to the first coil; a conductor coupled to the second frame; and a detector for calculating a relative position between the first frame and the second frame by monitoring the second voltage.

The displacement sensor may further comprise a first elastic member for connecting the first frame with the second frame, variable in accordance with a change of the relative position between the first frame and the second frame.

One of the first frame and the second frame may be fixed, and a position of the other one may be varied.

The second coil may have a diameter the same as or greater than that of the first coil.

The second voltage may have a size which is reduced if the second coil is close to the conductor.

The first voltage may have a waveform which is vibrated at a predetermined cycle, and the second voltage may have a waveform corresponding to that of the first voltage and have a size different from that of the first voltage.

In another aspect of the present invention, a camera module comprises a housing having a light transmission portion at one side; a lens module packaged in the housing, transferring incident light through the light transmission portion to a first direction; an image sensor converting the light, which has passed through the lens module, to a digital signal; a first frame located inside the housing; a second frame located inside the housing; a first coil to which a first voltage formed at the first frame is applied; a second coil formed at the first frame, to which a current of a second voltage flows to correspond to the voltage of the first frame if the first voltage is applied to the first coil; a conductor coupled to the second frame; and a detector for calculating a relative position between the first frame and the second frame by monitoring the second voltage.

One of the first frame and the second frame may be fixed, and a position of the other one may be varied.

The second coil may have a diameter the same as or greater than that of the first coil.

The second voltage may have a size which is reduced if the second coil is close to the conductor.

The first voltage may have a waveform which is vibrated at a predetermined cycle, and the second voltage may have a waveform corresponding to that of the first voltage and have a size different from that of the first voltage.

The first frame and the second frame have pipe shapes of which diameters are different from each other, and are arranged to be overlapped with each other to allow one of the first frame and second frame, which has a smaller diameter, to be arranged at an inner side, the lens module is received in an inner side of the frame having the smaller diameter, and the first and second coils are wound at a side of the first frame, wherein the camera module may further comprise a magnet located at the second frame.

The first frame moves in a first direction if a current flows to the first coil, wherein the camera module may further comprise a first elastic member for connecting the first frame with the second frame, variable in accordance with movement of the first frame.

The moving amount of the first frame may be varied depending on the size of the first voltage flowing to the first coil.

The magnet may be arranged to be closer to the first coil than the second coil, and the conductor may be arranged to be closer to the second coil than the first coil.

The second frame has a pipe shape for receiving the lens module therein, the first frame is located around the outside of the second frame, and the first and second coils are wound at a side of the first frame, wherein the camera module may further comprise a magnet located at the first frame, and a third coil wound at a side of the second frame, for moving the second frame in a first direction if a current flows thereto.

The first frame includes a substrate attached to the housing, the first coil is formed on the substrate and has a helical shape of which diameter is increased, the second coil is formed on the substrate and has a helical shape of which diameter is increased while surrounding the outside of the first coil, the second frame has a cylindrical shape for receiving the lens module therein, wherein the camera module may further comprise a third frame surrounding the outside of the second frame, a magnet located at the third frame, and a third coil wound at a side of the second frame, for moving the second frame in a first direction if a current flows thereto.

The conductor may be formed to be smaller than a diameter of a center opened portion of the first coil.

The camera module may further comprise a second elastic member for connecting the second frame with the housing; and a horizontal driving unit for controlling movement of the second frame in a second direction vertical to the first direction inside the housing.

According to the displacement sensor and the camera module according to the present invention, since two coils may be provided in one frame, the number of processes can be reduced and space utility can be enhanced.

Particularly, if two coils are provided on a substrate, the volume can get smaller. Since one of coils used for the displacement sensor may also be used as a coil for moving a lens module and thus only one coil is added, the number of terminals can be reduced and the number of additionally provided members can be reduced.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
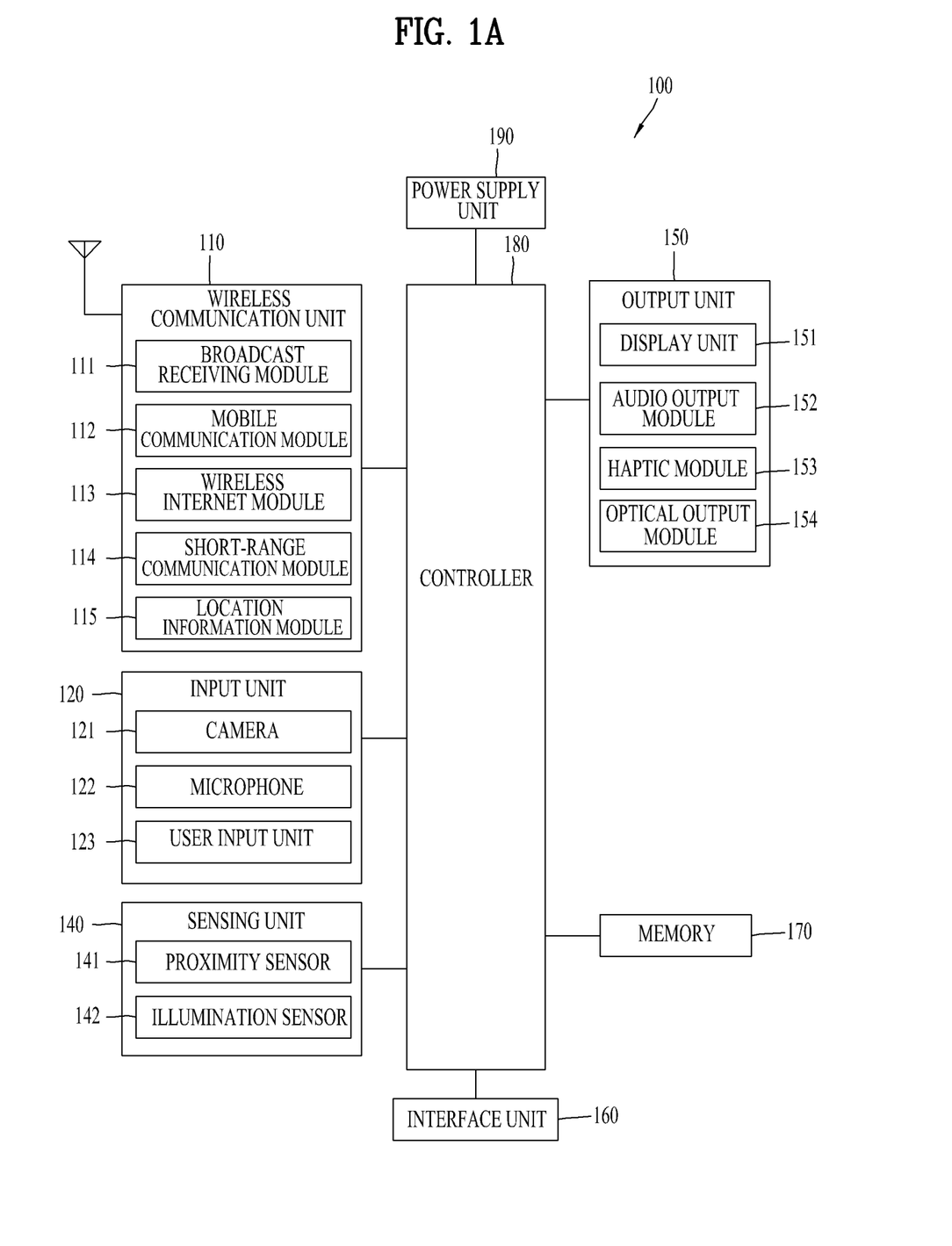
FIG. 1A is a block diagram of a mobile terminal in accordance with the present disclosure.
Figure 1B:
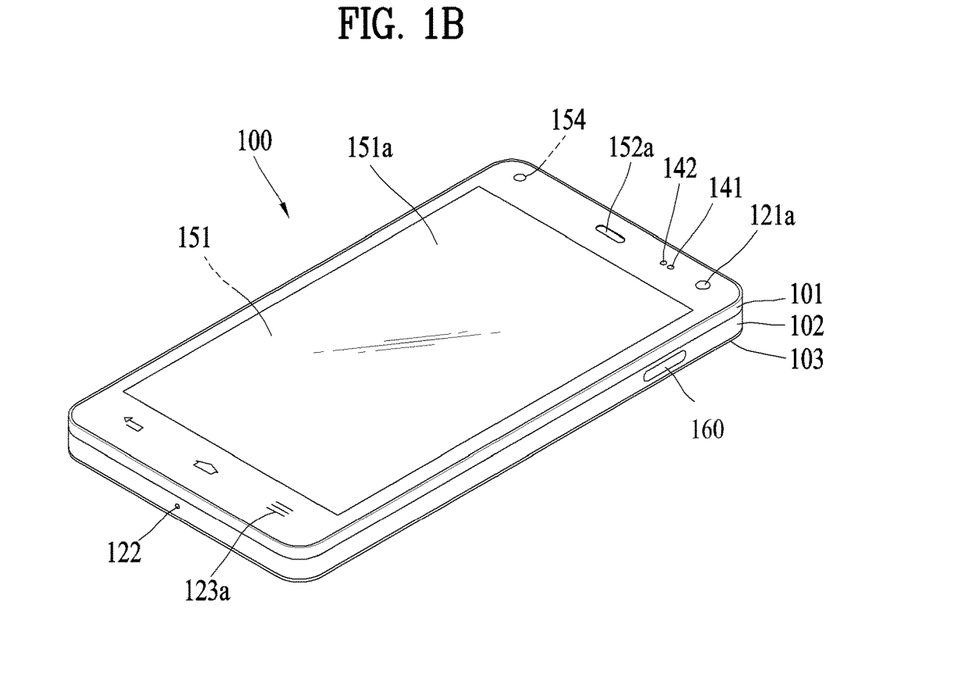
FIGS. 1B and 1C are conceptual views of one example of the mobile terminal, viewed from different directions.
Figure 1C:
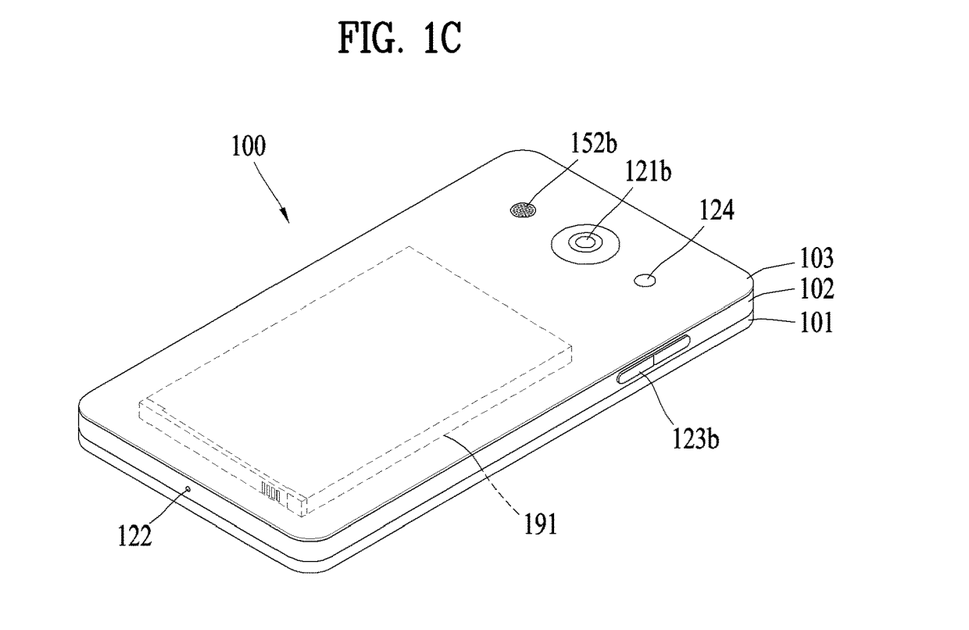

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190.

It is understood that implementing all of the illustrated components in The FIG. 1A is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like.

For example, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
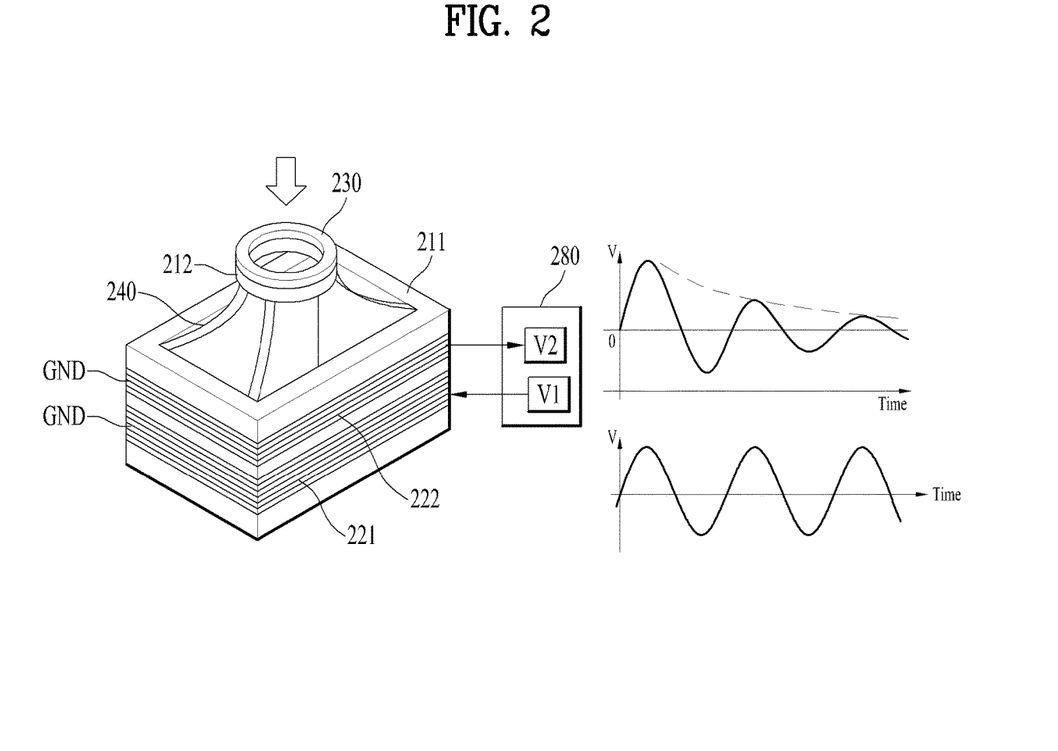
FIG. 2 is a conceptual view illustrating an embodiment of a displacement sensor related to the present invention.

FIG. 2 is a conceptual view illustrating an embodiment of a displacement sensor related to the present invention. The displacement sensor of the present invention includes a first frame 211 of which position is relatively variable, a second frame 212, first and second coils 221 and 222 located at the first frame 211, and a conductor 230 located at the second frame 212.

The first frame 211 has a pillar or pipe shape to wind the first coil 221 and the second coil 222 around a side thereof. Although the first frame 211 of a rectangular pipe shape is shown, the first frame 211 may have a circular pipe shape.

The first coil 221 and the second coil 222 may be arranged in an up and down direction of the pillar or pipe of the first frame 211, and up and down positions of the first coil 221 and the second coil 222 may be changed. If the first coil 221 and the second coil 222 are formed at the first frame 211 at the same time, it is advantageous that the manufacturing process is simpler than the case that the first coil 221 and the second coil 222 are respectively formed at two frames.

Since the positions of the first coil 221 and the second coil 222 are fixed to the first frame 211, an interval between the first coil 221 and the second coil 222 is fixed. If a first voltage V1 is applied to the first coil 221, a current of a second voltage V2 flows to the second coil 222 in accordance with the electromagnetic induction principle. The current flows at the second coil 222 and energy is transferred by an effect of an eddy current formed at the first coil 221. Intensity of the second voltage flowing to the second coil 222 may be varied depending on the distance between the first coil 221 and the second coil 222. Since the transferred energy is great if the distance between the first coil and the second coil is short, the second voltage of the second coil 222 becomes great.

Since the first coil 221 and the second coil 222 of the present invention are fixed to the first frame 211, the interval between the first coil 221 and the second coil 222 is fixed, whereby the second voltage also uniformly occurs if the first voltage flowing to the first coil 221 uniformly occurs.

The conductor 230 located at the second frame 212 is located near the first coil 221 and the second coil 222, and the distance between the first coil 221 and the second coil 222 is varied as the distance between the first frame 211 and the second frame 212 is varied. If the conductor 230 is located near the first coil 221 and the second coil 222, energy transferred from the first coil 221 to the second coil 222 is partially transferred to the conductor 230. Therefore, the second voltage of the second coil 222 is varied depending on the distance with the conductor 230 even if the first voltage uniformly occurs.

As shown in FIG. 2, if the conductor 230 is close to the second coil 222, the second voltage of the second coil 222 becomes smaller. By contrast, if the conductor 230 is far away from the second coil 222, the second voltage of the second coil 222 becomes greater.

A detector 280 may calculate an interval (or interval between the first frame 211 and the second frame 212) between the conductor 230 and the second coil 222 by monitoring the size of the second voltage. In a state that a magnet 214 is arranged near the first coil 221, if the voltage is applied to the first coil 221, the first coil 221 is forced along a center axis direction of the coil by Lorentz force within a magnetic field of the magnet 214, whereby the first frame 211 is moved.

In this case, if the position of the first frame 211 is varied, the distance between the conductor 230 located at the second frame 212 and the second coil 222 is varied. Therefore, the size of the second voltage is varied, whereby a change in the interval between the first frame 211 and the second frame 212 may be calculated. If the second frame 212 is fixed, the change in the interval between the first frame 211 and the second frame 212 corresponds to the moving distance of the first frame 211.

If parts other than the displacement sensor are arranged near the displacement sensor, since a current may flow to the second coil 222 by an effect of the other parts, the first voltage may be based on a pulse wave of a predetermined pattern (sine wave, triangular wave, square wave) as shown in FIG. 2 to more exactly extract a power component transmitted by the first voltage of the first coil 221. That is, if noise occurs in a second voltage pattern, only a pattern corresponding to the first voltage is extracted, whereby more exact displacement may be measured.

If the first frame 211 moves freely, since position control of the first frame 211 is not possible, a first elastic member 240 connecting the first frame 211 with the second frame 212 may further be provided. A spring or plate spring may be used as the first elastic member 240. By the first elastic member 240, the first frame 211 is limited to be moved to only a specific direction (center axis direction of the coil) with respect to the second frame 212, whereby more exact position change can be sensed.

Figure 3:
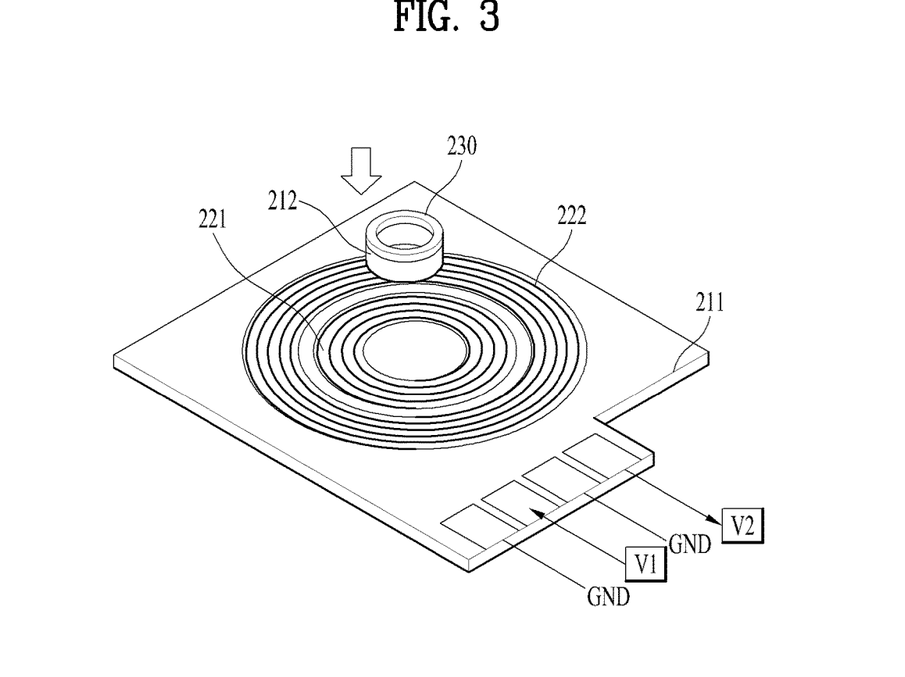
FIG. 3 is a conceptual view illustrating another embodiment of a displacement sensor related to the present invention.

FIG. 3 is a conceptual view illustrating another embodiment of a displacement sensor related to the present invention. Unlike the embodiment shown in FIG. 2, the first frame 211 may be a flat shaped member such as a substrate. The first coil 221 and the second coil 222, which are formed at this flat shaped first frame 211, may be formed at the first frame 211 of the substrate shape as a helical coil of which diameter is gradually increased.

In the embodiment of FIG. 2, the radius (means a length when a coil is wound one round by assuming a circular shape although shown in a rectangular shape) of each of the first coil 221 and the second coil 222 is shown at the same length. However, in the embodiment of FIG. 3, the radius of the first coil 221 is different from the radius of the second coil 222.

As shown in FIG. 3, the second coil 222 may be arranged at the outside of the first coil 221 so as not to overlap the first coil 221. Since an eddy current flows outwardly, the radius of the second coil 222 should be greater than the radius of the first coil 221 to facilitate power transfer to the second coil 222, whereby the second coil 222 may be arranged at the outside of the first coil 221.

The second frame 212 is arranged to be spaced apart from the first frame 211. Even in this case, if the conductor 230 is close to the first frame 211, the size of the second voltage flowing to the second coil 222 becomes smaller.

Figure 4:
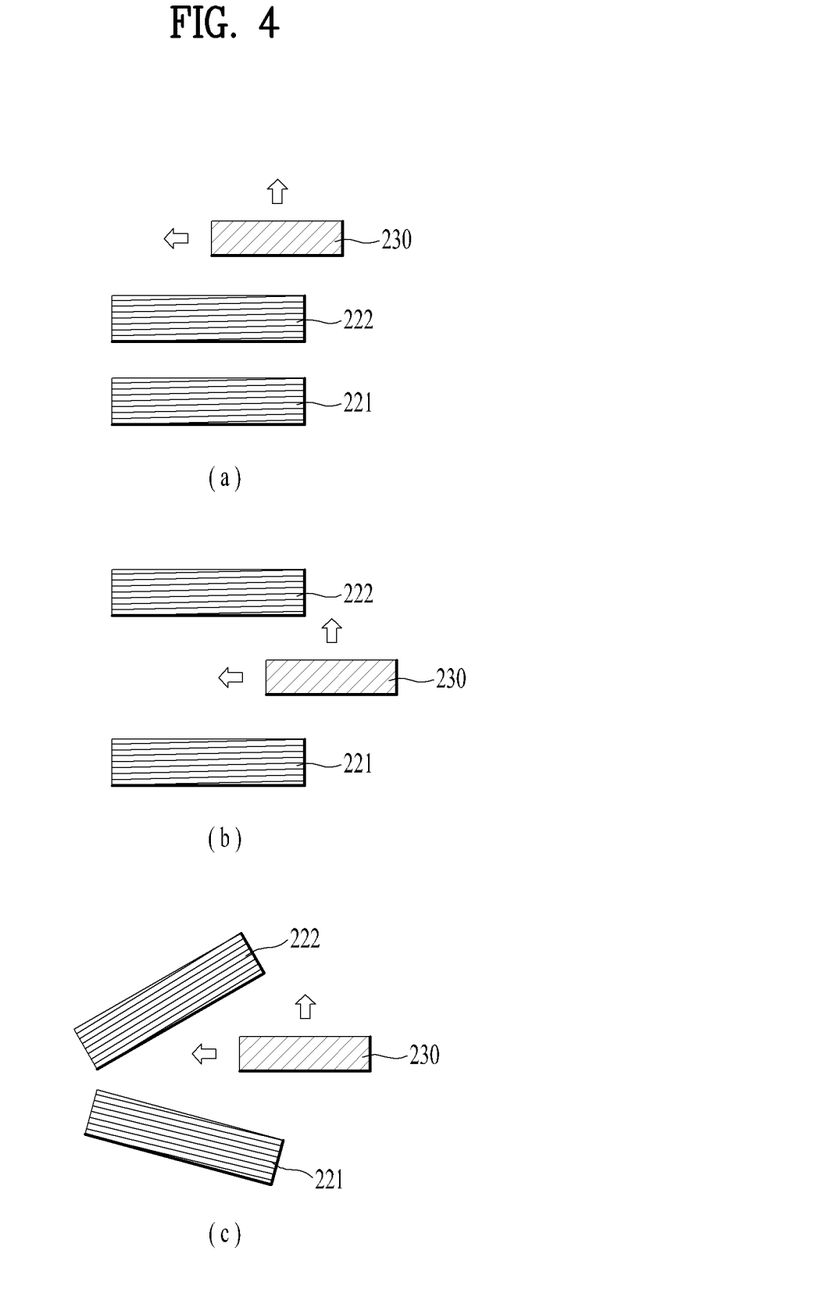
FIG. 4 is a conceptual view illustrating various embodiments of arrangement of a first coil, a second coil and a conductor of a displacement sensor related to the present invention.

Various modifications may be made in the arrangement of the first coil 221, the second coil 222 and the conductor 230. FIG. 4 is a conceptual view illustrating various embodiments of arrangement of a first coil 221, a second coil 222 and a conductor 230 of a displacement sensor related to the present invention.

(a) of FIG. 4 briefly illustrates arrangement of the first coil 221, the second coil 222 and the conductor 230 according to the embodiment of FIG. 2. The conductor 230 may be moved in a vertical direction or a horizontal direction. However, even though the conductor 230 is moved at the same distance in the vertical direction and the horizontal direction, the case that the conductor 230 is moved in a vertical direction is different from the case that the conductor 230 is moved in a horizontal direction in variation of the second voltage. Therefore, to measure the exact amount of movement, it is preferable that the first frame 211 (or the second frame 212) is moved in a specific direction only. In the embodiments of FIGS. 2 and 3, the conductor 230 is moved relatively with respect to the first coil 221 and the second coil 222 in a center axis direction along which the coil is wound.

As shown in (b) of FIG. 4, the conductor 230 may be located between the first coil 221 and the second coil 222. As shown in (c) of FIG. 4, the first coil 221 and the second coil 222 may not be necessarily parallel with each other.

As described above, since the displacement sensor may sense a distance change by using two coils and one conductor 230 only, the displacement sensor may be miniaturized, and thus may be used for various electronic parts. Particularly, if various parts are used for a miniaturized product such as a mobile terminal, the displacement sensor of the present invention may be used.

Particularly, a camera module 200 packaged in the mobile terminal needs an auto-focus function for allowing a user to clearly see a target object which becomes a subject. For this auto-focus function, various types of actuators are used to move a lens module 260 to an optimal focal position. Performance of the auto-focus of the camera module 200 may be varied depending on characteristics of the actuator that moves the lens module 260.

Also, the auto-focus actuator may include various types of actuators such as a voice coil motor (VCM) actuator, an actuator driven by a pressure power, and an MEMS actuator driven by a capacitance mode.

In this case, the voice coil motor actuator drives the lens module 260 by means of Lorentz force flowing to the coil by locating a permanent magnet 214 at a fixed portion of the camera module 200 and attaching the coil to the lens module 260, which will be driven, to configure a magnetic circuit.

Also, the voice coil motor actuator may calculate an optimal auto-focus value of the lens module 260 by attaching a sensor to the lens module 260 to sense a position change of the lens module 260.

In this voice coil motor actuator, to attach the sensor to the lens module 260, three or more power sources should be connected to the sensor, and two connectors for applying a voltage to drive the voice coil are required. Therefore, at least five connectors are required to sense driving and displacement of the lens module 260. If the number of connectors is increased, problems occur in that it is difficult to design the actuator and a defect ratio is increased in a manufacturing process.

Also, in the voice coil type actuator based on the lens module 260 to which the sensor is attached, it takes much time to move the lens module 260 to an optimal auto-focus position, and an auto-focus position error of the lens module 260 may occur due to hysteresis characteristic and structural friction characteristic.

Figure 5:
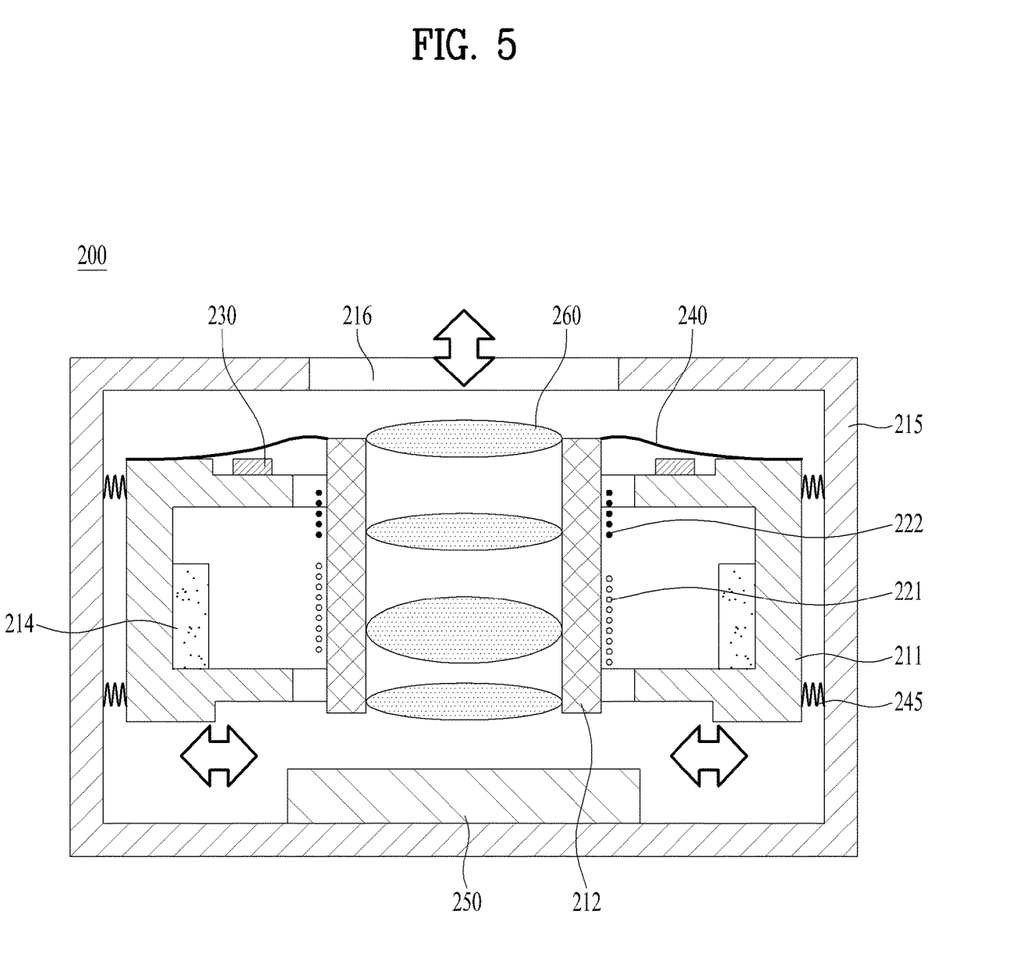
FIG. 5 is a conceptual view illustrating a first embodiment of a camera module related to the present invention.

The present invention may embody a simpler camera module 200 by using the aforementioned displacement sensor. FIG. 5 is a conceptual view illustrating a first embodiment of a camera module 200 related to the present invention. The camera module 200 of the present invention includes a housing 215, a lens module 260, an image sensor 250, a first frame 211, a second frame 212, a first coil 221, a second coil 222, a first elastic member 240, a magnet 214, and a second elastic member 245.

The housing 215 forms appearance of the camera module 200, and includes a light transmission portion 216 at one side to allow light to pass through. The lens module 260 is arranged at an inner side of the light transmission portion 216 to transfer light, which enters the light transmission portion 216 at one side of the housing 215, to an image sensor 250 located inside the housing 215.

The camera module may include at least one or more lenses. As a distance between the lens and the image sensor 250 is varied, a size and a focus of an image which reaches the image sensor 250 may be controlled.

To relatively move the lens module 260 to the image sensor 250 fixed to the housing 215, the voice coil described as above is used. The voice coil may be used as a driving member for movement of the lens module 260 and at the same time used as a sensor for sensing a moving distance of the lens module 260.

The present invention includes the aforementioned displacement sensor. The displacement sensor includes a first frame 211 of a pipe shape, a second frame 212 of which distance with the first frame 211 is varied, first and second coils 221 and 222 formed at the first frame 211, a conductor 230 coupled to the second frame 212, and a detector 280 monitoring a size of a second voltage flowing to the second coil 222. In this embodiment, the first frame 211 has a pipe shape, and the second frame 212 may be arranged to surround the outside of the first frame 211.

The lens module 260 of this embodiment is fixed to the first frame 211, and the first frame 211 is formed in a pipe shape to receive the lens module 260 therein. The lens module 260 is inserted into the inner space of the pipe as shown in FIG. 5.

The first coil 221 of the present invention serves as a driver for driving the lens module 260 as well as a component of the displacement sensor. If the first voltage is applied to the first coil 221 within a magnetic field formed by the magnet 214 (in this embodiment, the magnet 214 is fixed to the second frame 212) arranged to be spaced apart from the first frame 211, the first frame 211 is moved by Lorentz force.

At this time, the current of the second voltage flows to the second coil 222 in accordance with the electromagnetic induction principle, and the detector 280 monitors the size of the second voltage. At this time, since the second frame 212 does not move, the distance between the conductor 230 and the second coil 222 is varied, and the size of the second voltage is also varied.

Referring to FIG. 5, since the conductor 230 is located above the second coil 222, the light transmission portion 216 determines that the first frame 211 moves downwardly (direction of the image sensor 250) if the size of the second voltage is increased and the first frame 211 moves upwardly (direction of the light transmission portion 216) if the size of the second voltage is reduced.

The first elastic member 240 may be interposed between the first frame 211 and the second frame 212 to restrict a moving direction of the first frame 211 such that the first frame 211 moves to only a direction that a plurality of lenses are arranged with respect to the second frame 212. Although the conductor 230 is located above the second coil 222 as shown, the conductor 230 may be located below the second coil 222. However, the conductor 230 may be arranged to be closer to the second coil 222 than the first coil 221 to minimize an effect of the conductor 230 on the first coil 221.

If the lens module 260 moves to only an arrangement direction of the lens, the second frame 212 may be fixed to the housing 215 or the housing 215 may be a second module. However, the lens module 260 is required to move to a horizontal direction, as shown in FIG. 5, the second frame 212 may further include a horizontal driving unit (not shown) which is fixed to the housing 215 to move in a horizontal direction and moving the second frame 212 in a horizontal direction.

If the second frame 212 moves in a horizontal direction, since the first frame 211 moves in a vertical direction only with respect to the second frame 212, the first frame 211 and the lens module 260 received in the first frame 211 may move together in a horizontal direction.

At this time, since there is no change in a relative position of the first frame 211 and the second frame 212, even though the second frame 212 moves in a horizontal direction, a distance change (change in vertical distance of the image sensor 250 and the lens module 260) between the first frame 211 and the second frame 212, which is determined by the detector 280, is exact.

Figure 6:
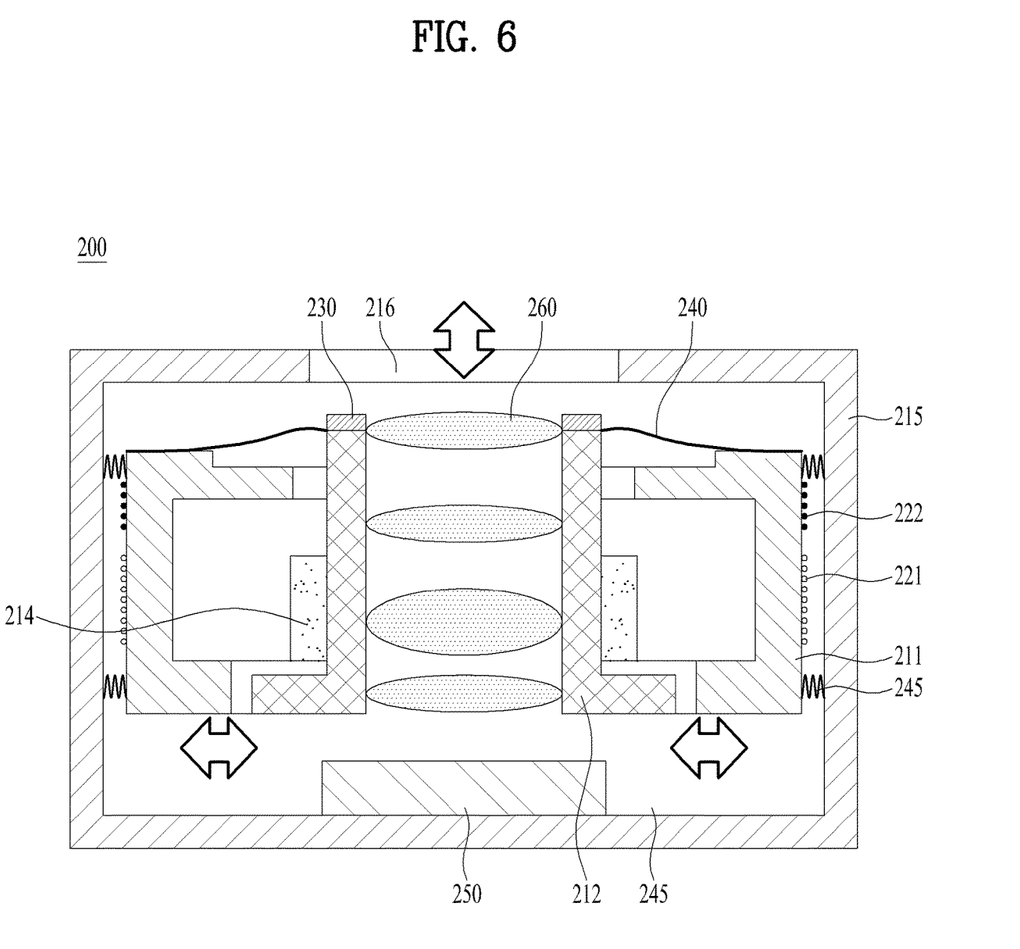
FIG. 6 is a conceptual view illustrating a second embodiment of a camera module related to the present invention.

FIG. 6 is a conceptual view illustrating a second embodiment of a camera module related to the present invention. Arrangement of the first frame 211 and the second frame 212 in FIG. 5 is opposite to arrangement of the first frame 211 and the second frame 212 in this embodiment. That is, the first frame 211 to which the first coil 221 and the second coil 222 are coupled is located at the outside, and the second frame 212 to which the conductor 230 is coupled is located at the inner side of the first frame 211.

The lens module 260 and the magnet 214 are arranged at the second frame 212, and the first frame 211 is fixed to the housing 215 in a vertical direction. Therefore, the second frame 212 changes an up and down position of the lens module 260 while moving up and down.

The moving principle of the second frame 212 is the same as the aforementioned principle, and since the second frame 212 is fixed in a vertical direction in the aforementioned embodiment, the first frame 211 moves in a vertical direction. In this embodiment, since the first frame 211 is fixed in a vertical direction, the second frame 212 moves in a vertical direction.

Figure 7:
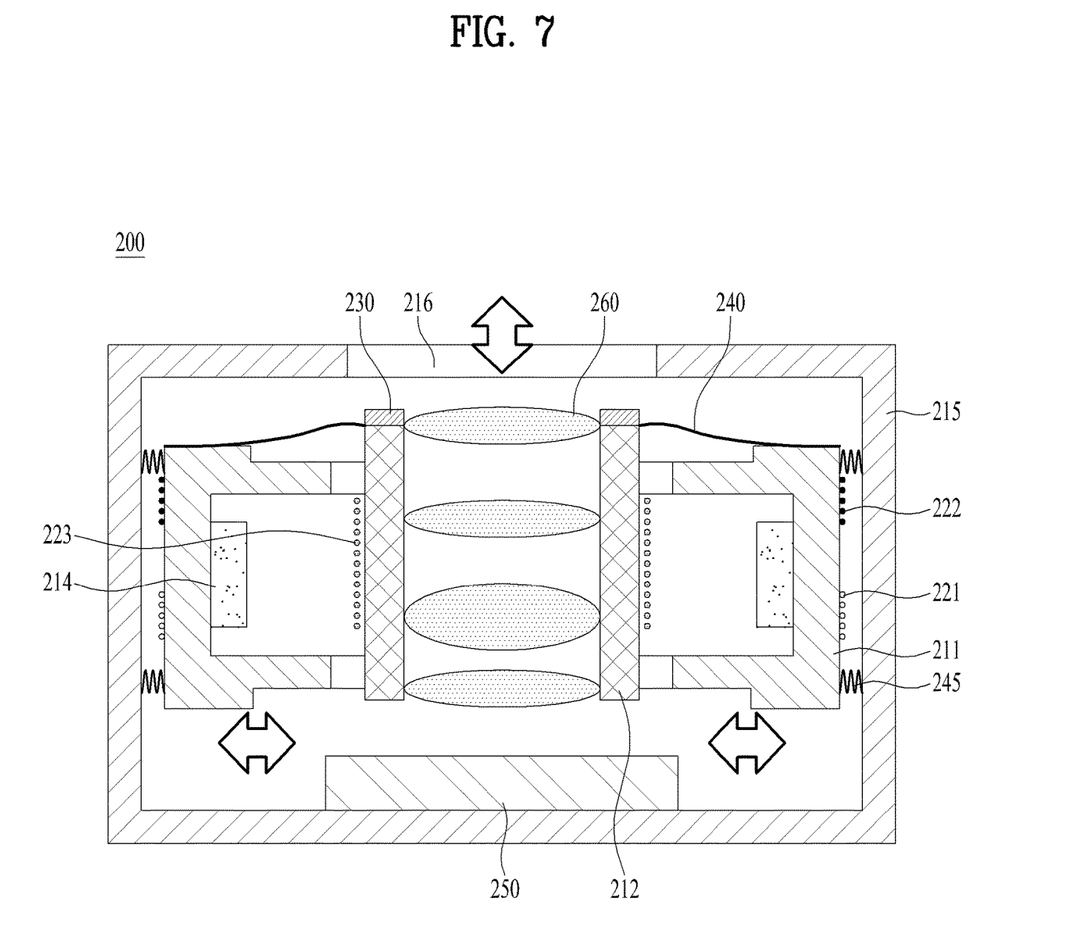
FIG. 7 is a conceptual view illustrating a third embodiment of a camera module related to the present invention.

Next, FIG. 7 is a conceptual view illustrating a third embodiment of a camera module 200 related to the present invention. In this embodiment, a voice coil (hereinafter, referred to as a third coil 223) for driving the lens module 260 separately from the first coil 221 and the second coil 222 of the displacement sensor is provided separately.

In this embodiment, arrangement of the displacement sensor, the lens module 260 and the image sensor 250 is the same as the arrangement in the embodiment of FIG. 6. However, in this embodiment, the magnet 214 is coupled to the first frame 211 and the third coil 223 is coupled to the second frame 212, whereby a force of the third coil 223 for moving the second frame 212 in a vertical direction is provided.

Since the first coil 221 and the second coil 222 are fixed to the first frame 211 such as the magnet 214, their positions cannot be changed by the magnet 214. If a third voltage is applied to the third coil 223 coupled to the second frame 212, the second frame 212 moves relatively to the first frame 211 by means of Lorentz force.

At this time, if the first voltage is applied to the first coil 221, the current of the second voltage flows to the second coil 222, and if the second frame 212 moves, the distance between the conductor 230 and the second coil 222 is varied, whereby the moving amount of the second frame 212 may be calculated through the variation of the second voltage of the second coil 222. The first voltage applied to the first coil 221 may be the same as or different from the third voltage applied to the third coil 223.

Figure 8:
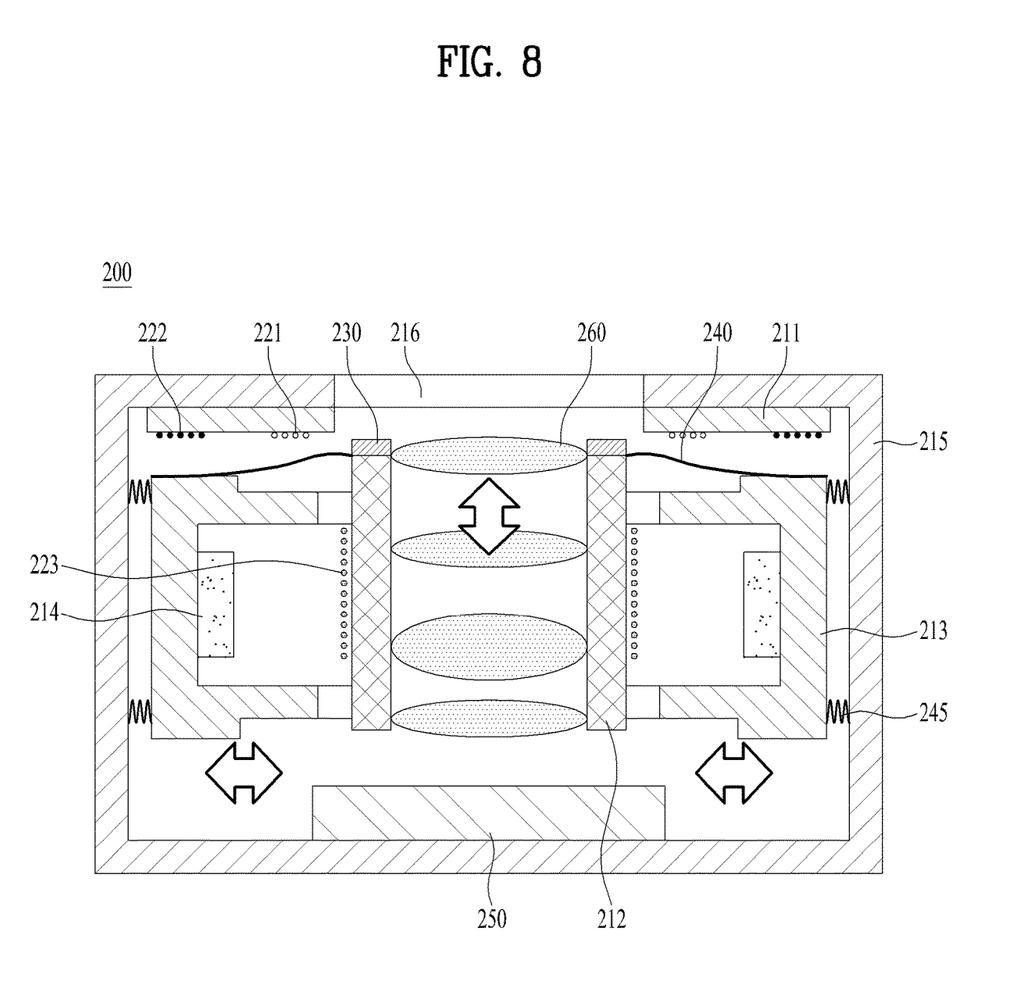
FIG. 8 is a conceptual view illustrating a fourth embodiment of a camera module related to the present invention.

FIG. 8 is a conceptual view illustrating a fourth embodiment of a camera module 200 related to the present invention. The displacement sensor of this embodiment uses the first coil 221 and the second coil 222, which are embodied in the first frame 211 of a plane as shown in FIG. 3.

In this embodiment, arrangement of the third coil 223 and the magnet 214 are the same as the arrangement of FIG. 7 but the first coil 221 and the second coil 222 are arranged unlike FIG. 7. Therefore, a frame to which the magnet 214 is coupled and which is fixed to the housing 215 in a vertical direction will be referred to as a third frame 213.

Since the first frame 211 of this embodiment is a plate shaped frame, the first frame 211 may be coupled to a surface of the housing 215. The second frame 212 located at the inner side of the third frame 213 moves up and down by means of Lorentz force if the third voltage is applied to the third coil 223 and varies a vertical position of the lens.

Since the position of the conductor 230 located at the second frame 212 is varied with respect to the first frame 211 fixed to the housing 215, the second voltage of the second coil 222 is varied in accordance with vertical movement of the lens module 260, whereby the detector 280 may calculate the moving amount of the lens module 260.

In the embodiments of FIGS. 5 to 7, the first frame 211 and the second frame 212 are fixed in a horizontal direction. However, in this embodiment, if the first frame 211 is fixed to the housing 215 and the third frame 213 moves in a horizontal direction with respect to the image sensor 250 (or the housing 215), horizontal positions of the second frame 212 and the first frame 211 are varied.

When viewed on the drawing, if the conductor 230 is overlapped with the first coil 221 and the second coil 222, the second voltage of the second coil 222 is affected by a vertical change of the conductor 230, whereas the second voltage of the second coil 222 is not affected by a horizontal change of the conductor 230 if the conductor 230 is not overlapped with the first coil 221 and the second coil 222.

Therefore, the conductor 230 is formed to be smaller than the diameters of the first coil 221 and the second coil 222 as shown in FIG. 8, even though the second frame 212 and the third frame 213 move in a horizontal direction, the conductor 230 is not overlapped with the first coil 221 and the second coil 222 and is located at a ring shaped center opened portion, whereby the displacement sensor may be prevented from being operated in error due to the horizontal movement.

As described above, the displacement sensor and the camera module 200 according to the present invention can reduce the number of process times and enhance space utility by embodying two coils in one frame.

Particularly, if two coils are embodied on the substrate, the volume can become smaller. Since one of the coils used for the displacement sensor can also be used as a coil for moving the lens module 260 and thus only one coil is added, the number of terminals can be reduced and the number of additionally provided members can be reduced.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the specification are included in the scope of the invention.

What is claimed is:

1. A displacement sensor comprising:
   a first frame;
   a second frame;

a first elastic member for connecting the first frame with the second frame;

a first coil, wherein a first voltage formed at the first frame is applied to the first coil;

a second coil formed at the first frame, wherein a current of a second voltage flows in the second coil to correspond to a voltage of the first frame if the first voltage is applied to the first coil;

a conductor coupled to the second frame; and a detector for calculating a relative position between the first frame and the second frame by monitoring the second voltage, wherein the first elastic member varies in accordance with a change of the relative position between the first frame and the second frame, and wherein a size of the second voltage is reduced if the second coil is moved closer to the conductor.

2. The displacement sensor according to claim 1, wherein one of the first frame and the second frame is fixed, and a position of the other one is altered.

3. The displacement sensor according to claim 1, wherein a diameter of the second coil is equal to or greater than a diameter of the first coil.

4. The displacement sensor according to claim 1, wherein a waveform of the first voltage vibrates at a predetermined cycle, and a waveform of the second voltage corresponds to the waveform of the first voltage and has a size different from a size of the first voltage.

5. A displacement sensor comprising:

a first cylindrical-shaped frame;

a second cylindrical-shaped frame having a different diameter from a diameter of the first cylindrical-shaped frame;

a first coil wounded at the first cylindrical-shaped frame, wherein a first voltage is applied;

a second coil wounded at the first cylindrical-shaped frame, wherein a current of a second voltage flows to correspond to the voltage of the first cylindrical-shaped frame if the first voltage is applied to the first coil;

a magnet coupled to the second cylindrical-shaped frame;

a conductor coupled to the second cylindrical-shaped frame; and a detector for calculating a relative position between the first cylindrical-shaped frame and the second cylindrical-shaped frame by monitoring the second voltage.

6. The displacement sensor according to claim 5, wherein the first cylindrical-shaped frame moves in a first direction if a current flows to the first coil, and the displacement sensor further comprises a first elastic member for connecting the first cylindrical-shaped frame with the second cylindrical-shaped frame, wherein the first elastic member varies in accordance with movement of the first cylindrical-shaped frame.

7. The displacement sensor according to claim 6, wherein the moving amount of the first cylindrical-shaped frame alters depending on the size of the first voltage applied to the first coil.

8. The displacement sensor according to claim 5, wherein the magnet is arranged to be closer to the first coil than the second coil, and the conductor is arranged to be closer to the second coil than the first coil.

9. A camera module comprising:

a housing including a light transmission portion at one side;

a lens module, packaged in the housing, transferring incident light through the light transmission portion to a first direction;

an image sensor, converting the light passed through the lens module to a digital signal;

a first cylindrical-shaped frame located inside the housing;

a second cylindrical-shaped frame located inside the housing, arranged to be overlapped with each other to allow one of the first cylindrical-shaped frame and second cylindrical-shaped frame having a smaller diameter to be arranged at an inner side;

a first coil formed at the first cylindrical-shaped frame, wherein a first voltage is applied;

a second coil formed at the first cylindrical-shaped frame, wherein a current of a second voltage flows to correspond to the voltage of the first cylindrical-shaped frame if the first voltage is applied to the first coil;

a conductor coupled to the second cylindrical-shaped frame; and a detector for calculating a relative position between the first cylindrical-shaped frame and the second cylindrical-shaped frame by monitoring the second voltage, wherein the lens module is received in an inner side of a frame having the smaller diameter among the first cylindrical-shape frame and the second cylindrical-shape frame.

10. The camera module according to claim 9, wherein one of the first cylindrical-shaped frame and the second cylindrical-shaped frame is fixed, and a position of the other one is altered.

11. The camera module according to claim 9, wherein a diameter of the second coil is equal to or greater than a diameter of the first coil.

12. The camera module according to claim 9, wherein a size of the second voltage is reduced if the second coil is closer to the conductor.

13. The camera module according to claim 9, wherein a waveform of the first voltage vibrates at a predetermined cycle, and a waveform of the second voltage corresponds to the waveform of the first voltage and has a size different from a size of the first voltage.

14. The camera module according to claim 9, wherein the first cylindrical-shaped frame moves in a first direction if a current flows to the first coil, and the camera module further comprises a first elastic member for connecting the first cylindrical-shaped frame with the second cylindrical-shaped frame, wherein the first elastic member varies in accordance with movement of the first cylindrical-shaped frame.

15. The camera module according to claim 9, wherein the moving amount of the first cylindrical-shaped frame alters depending on the size of the first voltage flowing to the first coil.

16. The camera module according to claim 9, further comprising a magnet located at the second cylindrical-shaped frame.

17. The camera module according to claim 16, wherein the magnet is arranged to be closer to the first coil than the second coil, and the conductor is arranged to be closer to the second coil than the first coil.

18. The camera module according to claim 9, wherein the second cylindrical-shaped frame receiving the lens module therein, the magnet located at the first cylindrical-shaped frame, and further comprising a third coil wound at a side of the second cylindrical-shaped frame, for moving the second cylindrical-shaped frame in a first direction if a current flows thereto.

19. The camera module according to claim 9, further comprising:
- a second elastic member for connecting the second cylindrical-shaped frame with the housing; and
- a horizontal driving unit for controlling movement of the second cylindrical-shaped frame in a second direction orthogonal to the first direction inside the housing.

* * * * *